(12) United States Patent
Simpson

(10) Patent No.: US 10,946,884 B2
(45) Date of Patent: Mar. 16, 2021

(54) PNEUMATIC CYLINDER ACTUATED PALLET JACK ASSEMBLY

(71) Applicant: Larry Simpson, Antioch, TN (US)

(72) Inventor: Larry Simpson, Antioch, TN (US)

(*) Notice: Subject to any disclaimer, the term of this patent is extended or adjusted under 35 U.S.C. 154(b) by 0 days.

(21) Appl. No.: 16/447,206

(22) Filed: Jun. 20, 2019

(65) Prior Publication Data

US 2020/0398881 A1    Dec. 24, 2020

(51) Int. Cl.
| | |
|---|---|
| *B66F 9/00* | (2006.01) |
| *B62B 3/06* | (2006.01) |
| *B66F 9/065* | (2006.01) |
| *B66F 9/12* | (2006.01) |
| *B66F 9/20* | (2006.01) |
| *B62B 5/06* | (2006.01) |

(52) U.S. Cl.
CPC ............ *B62B 3/0618* (2013.01); *B62B 5/063* (2013.01); *B66F 9/065* (2013.01); *B66F 9/12* (2013.01); *B66F 9/205* (2013.01); *B62B 2203/21* (2013.01); *B62B 2203/24* (2013.01)

(58) Field of Classification Search
CPC ... B62B 3/0612; B62B 5/0076; B62B 5/0069; B62B 5/063
See application file for complete search history.

(56) References Cited

U.S. PATENT DOCUMENTS

| | | | | |
|---|---|---|---|---|
| 4,082,195 A | * | 4/1978 | Wnek | B60P 1/60 180/119 |
| 4,589,669 A | | 5/1986 | Kedem | |
| 5,113,960 A | * | 5/1992 | Prinz | B62B 3/0612 180/65.51 |
| 6,354,080 B1 | | 3/2002 | Decker | |
| 7,744,335 B1 | | 6/2010 | Cleary | |
| 8,540,213 B2 | | 9/2013 | Feiquan | |
| 8,752,657 B2 | | 6/2014 | Newell | |
| 9,475,513 B2 | * | 10/2016 | Liu | B62B 5/0069 |
| 9,586,605 B2 | * | 3/2017 | He | B62B 3/0612 |
| 9,908,549 B2 | * | 3/2018 | Newell | B62B 5/0076 |
| 2006/0181039 A1 | | 8/2006 | Fridlington | |
| 2008/0053744 A1 | * | 3/2008 | Krenzin | B62B 3/0612 180/444 |
| 2008/0290469 A1 | * | 11/2008 | Grivna | H01L 23/585 257/620 |

* cited by examiner

*Primary Examiner* — Hau V Phan

(57) ABSTRACT

A pneumatic cylinder actuated pallet jack assembly for mechanically lifting and lower a pallet includes a pallet jack, a plurality of pneumatic cylinders, and a compressor. The forks of the pallet jack are slidably coupled to a frame of the pallet jack. Each of a pair of rear rollers that is coupled to a respective fork distal from the frame and a roller module that is slidably coupled to the frame are selectively vertically positionable. A tow bar is pivotally coupled to the frame proximate to the roller module. Pneumatic cylinders are operationally coupled singly to each of the forks, the pair of rear rollers, and to the roller module, and the compressor. The compressor is positioned to selectively actuate respective pneumatic cylinders to size a gap between the forks and to raise the forks and the frame to lift a load that is positioned on the pallet.

16 Claims, 4 Drawing Sheets

PNEUMATIC CYLINDER ACTUATED PALLET JACK ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relate to pallet jack assemblies and more particularly pertain to a new pallet jack assembly for mechanically lifting and lower a pallet.

BRIEF SUMMARY OF THE INVENTION

An embodiment of the disclosure meets the needs presented above by generally comprising a pallet jack, a plurality of pneumatic cylinders, and a compressor. The forks of the pallet jack are slidably coupled to a frame of the pallet jack. Each of a pair of rear rollers that is coupled to a respective fork distal from the frame and a roller module that is slidably coupled to the frame are selectively vertically positionable. A tow bar is pivotally coupled to the frame proximate to the roller module. Pneumatic cylinders are operationally coupled singly to each of the forks, the pair of rear rollers, and to the roller module, and the compressor. The compressor is positioned to selectively actuate respective pneumatic cylinders to size a gap between the forks and to raise the forks and the frame to lift a load that is positioned on the pallet.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
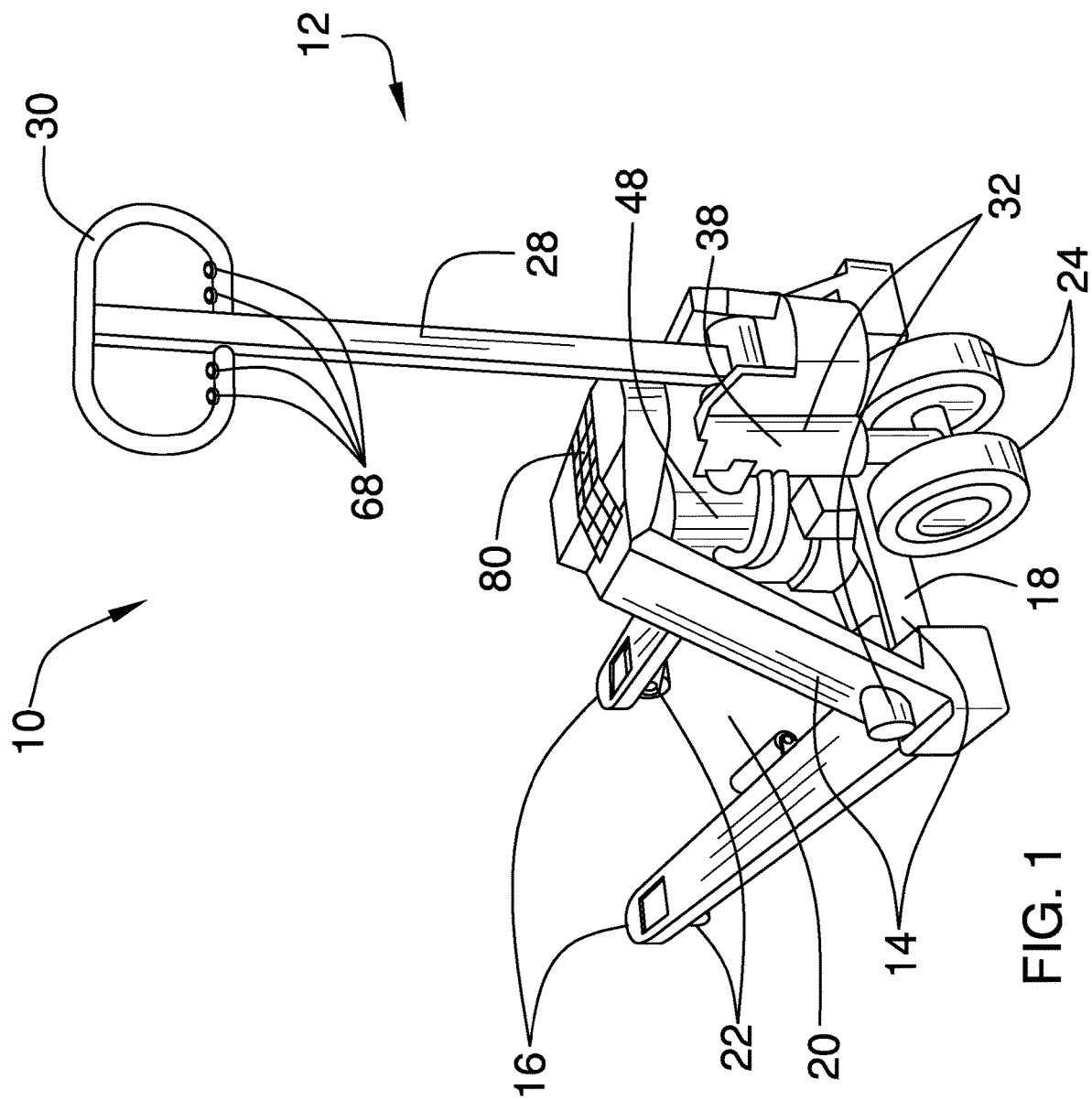
FIG. 1 is an isometric perspective view of a pneumatic cylinder actuated pallet jack assembly according to an embodiment of the disclosure.
Figure 2:
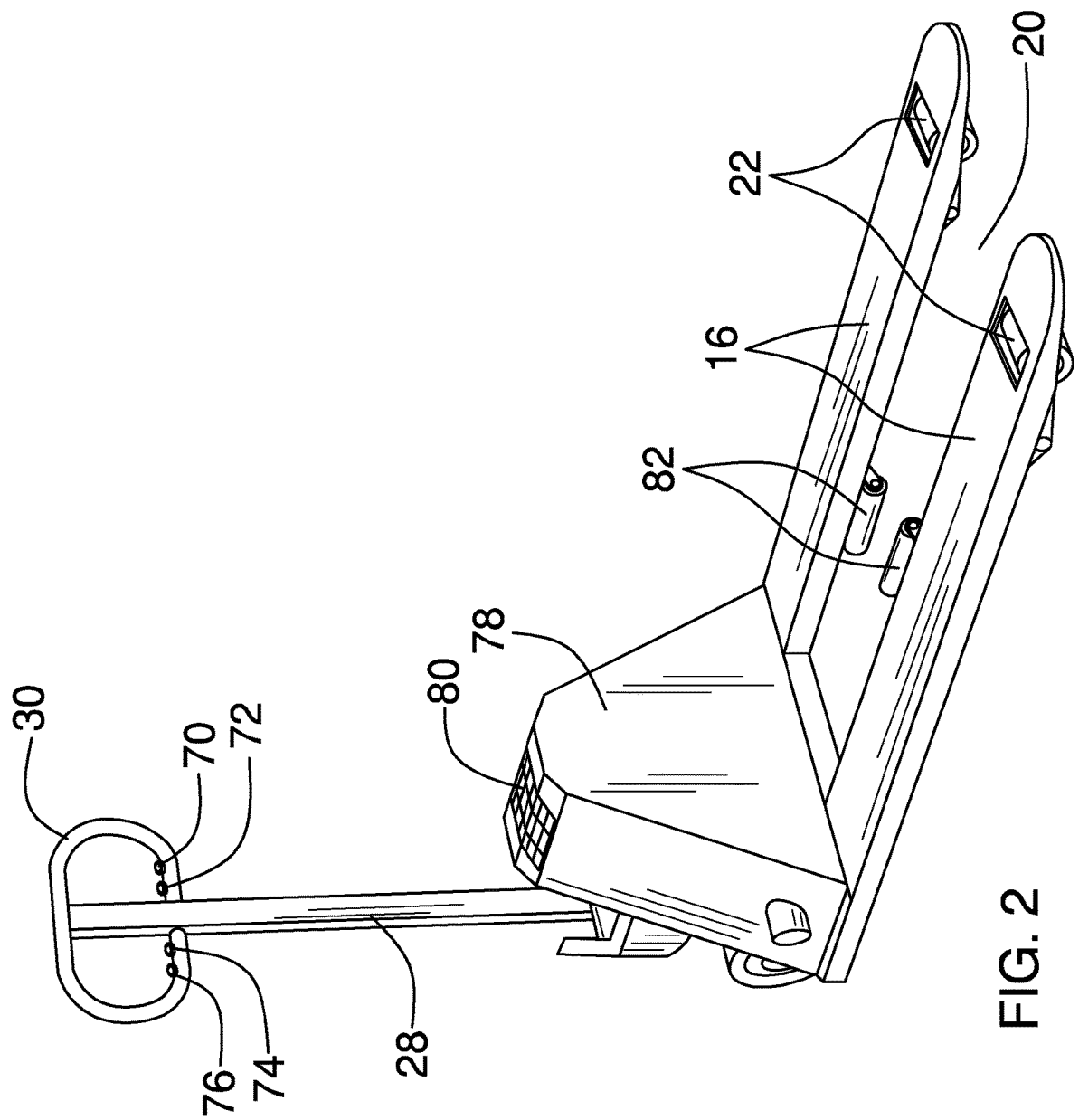
FIG. 2 is an isometric perspective view of an embodiment of the disclosure.
Figure 3:
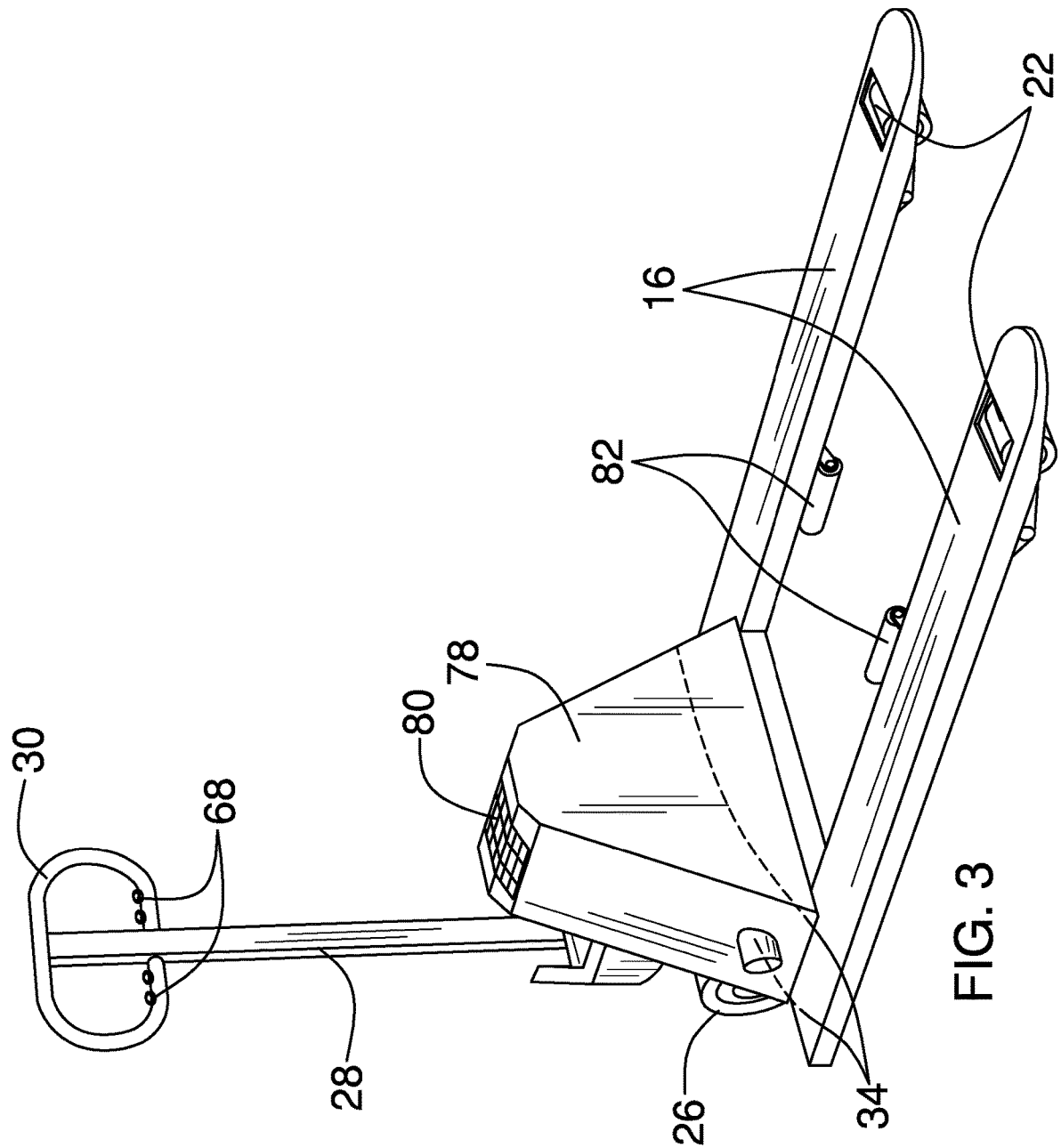
FIG. 3 is an isometric perspective view of an embodiment of the disclosure.
Figure 4:
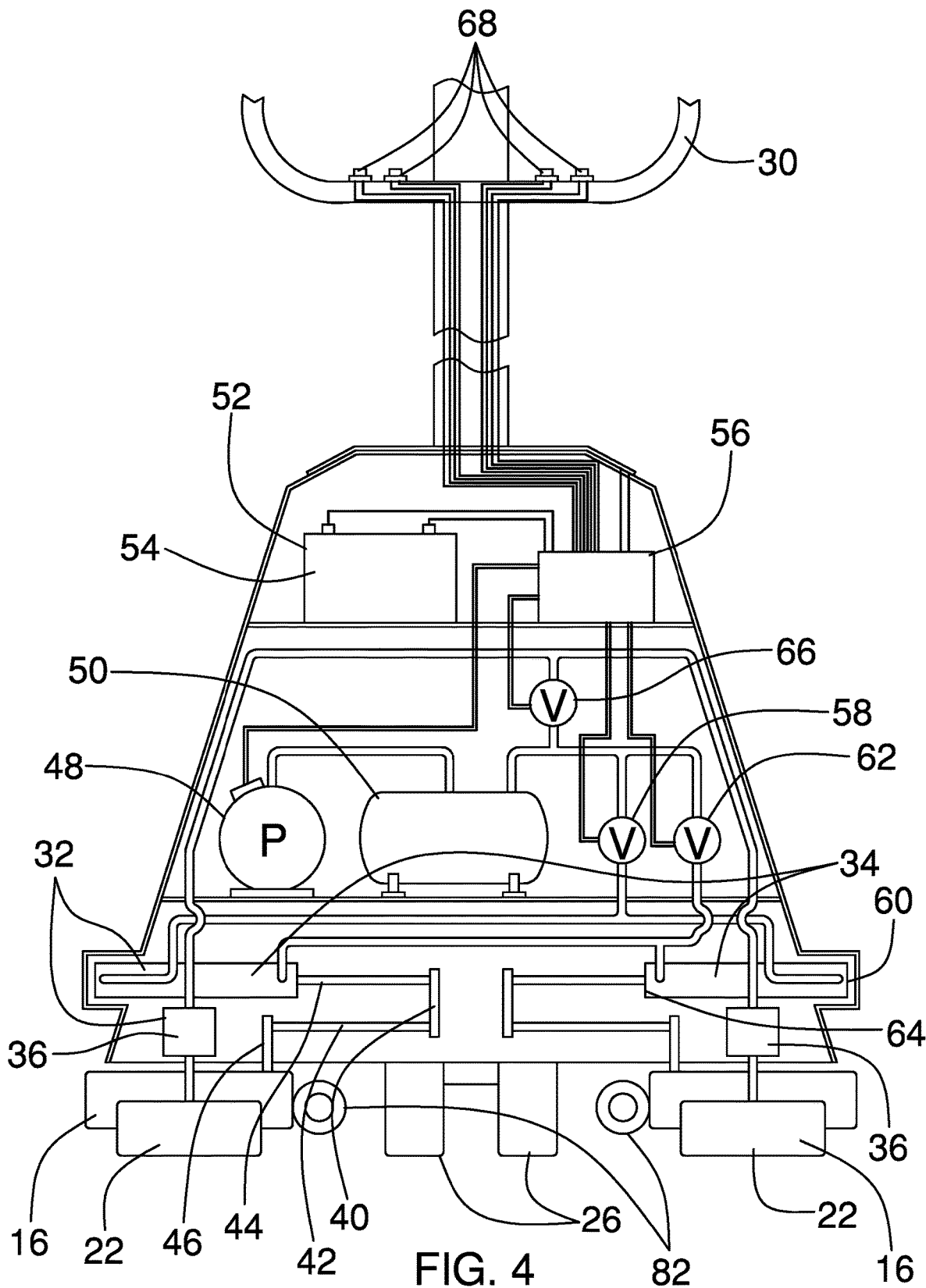
FIG. 4 is a rear view of an embodiment of the disclosure.

With reference now to the drawings, and in particular to FIGS. 1 through 4 thereof, a new pallet jack assembly embodying the principles and concepts of an embodiment of the disclosure and generally designated by the reference numeral 10 will be described.

As best illustrated in FIGS. 1 through 4, the pneumatic cylinder actuated pallet jack assembly 10 generally comprises a pallet jack 12, which comprises a frame 14. A pair of forks 16 is slidably coupled to and extends from a lower member 18 of the frame 14 so that a gap 20 between the forks 16 is selectively sizable. Each of a pair of rear rollers 22 is coupled to and extends from to a respective fork 16 distal from the frame 14. The respective fork 16 is selectively vertically positionable relative to the rear roller 22.

A roller module 24 is slidably coupled to the frame 14 so that the frame 14 is selectively vertically positionable relative to the roller module 24. The roller module 24 is opposingly positioned on the frame 14 relative to the forks 16. The roller module 24 comprises a pair of wheels 26 or other type of roller such as, but not limited to, castors and the like.

A tow bar 28 is pivotally coupled to the frame 14 proximate to the roller module 24. The tow bar 28 is operationally coupled to the roller module 24 so that the roller module 24 is selectively rotatable relative to the frame 14, concurrently with the tow bar 28, to allow steering of the pallet jack 12. A handle 30 is coupled to the tow bar 28 distal from the frame 14. The handle 30 is configured to be grasped in a hand of a user, positioning the user to pivot the tow bar 28 and to pull on the handle 30 to locomote the pallet jack 12 upon the rear rollers 22 and the roller module 24. The handle 30 is elongated ovally shaped.

A plurality of pneumatic cylinders 32 is coupled to the frame 14. Respective pneumatic cylinders 32 are operationally coupled singly to each of the forks 16, to each of the rear rollers 22, and to the roller module 24.

The plurality of pneumatic cylinders 32 comprises a pair of first cylinders 34. Each first cylinder 34 is coupled to the frame 14 proximate to a respective fork 16. The first cylinder 34 is operationally coupled to the respective fork 16 so that the first cylinder 34 is positioned to reversibly motivate the respective fork 16 horizontally relative to the frame 14.

The plurality of pneumatic cylinders 32 also comprises a pair of second cylinders 36. Each second cylinder 36 is coupled to a respective fork 16 proximate to an associated rear roller 22. The second cylinder 36 is operationally coupled to the associated rear roller 22 so that the second cylinder 36 is positioned to reversibly lower the associated rear roller 22 from the respective fork 16.

The plurality of pneumatic cylinders 32 also comprises a third cylinder 38. The third cylinder 38 is coupled to the frame 14 and is operationally coupled to the roller module 24 so that the third cylinder 38 is positioned to reversibly lower the roller module 24 from the frame 14.

Each of a pair of first plates 40 is coupled to a piston 44 of a respective first cylinder 34. Each of a pair of rods 42 is coupled to a respective first plate 40 so that the rod 42 extends from the respective first plate 40 codirectionally and in parallel with an associated piston 44. Each of a pair of second plates 46 is coupled to a respective rod 42 distal from an associated first plate. The second plate 46 is coupled to and extends between the respective rod 42 and an associated fork 16 so that lateral movement of the second plate 46 that is imparted by an associated piston 44 is transferred to the associated fork 16.

A compressor 48 is coupled to the frame 14 and is operationally coupled to the plurality of pneumatic cylinders 32. The compressor 48 is positioned to selectively actuate respective pneumatic cylinders 32, firstly to size the gap 20 to enable insertion of the forks 16 into a pallet, and, secondly, to raise the forks 16 and the frame 14 to lift a load that is positioned on the pallet. The user is positioned to locomote the pallet jack 12 and the load upon the rear rollers 22 and the roller module 24 using the tow bar 28.

A tank 50 that is coupled to the frame 14 is operationally coupled to the compressor 48 and the plurality of pneumatic cylinders 32. The tank 50 is configured to store compressed air. A power module 52 is coupled to the frame 14. The power module 52 comprises a battery 54 that is rechargeable.

A microprocessor 56 that is coupled to the frame 14 is operationally coupled to the power module 52, the compressor 48, and the plurality of pneumatic cylinders 32. A first valve 58 is operationally coupled to a first end 60 of each first cylinder 34, the compressor 48, and the microprocessor 56 so that the microprocessor 56 is positioned to selectively actuate the first valve 58 to decrease the gap 20. A second valve 62 is operationally coupled to a second end 64 of each first cylinder 34, the compressor 48, and the microprocessor 56 so that the microprocessor 56 is positioned to selectively actuate the second valve 62 to increase the gap 20. A third valve 66 is operationally coupled to the pair of second cylinders 36, the third cylinder 38, the compressor 48, and the microprocessor 56 so that the microprocessor 56 is positioned to selectively actuate the third valve 66 to raise the forks 16 and the frame 14 to lift the load that is positioned on the pallet.

A controller 68 that is coupled to the handle 30 is operationally coupled to the microprocessor 56. The controller 68 is configured to signal the microprocessor 56 to selectively actuate the first valve 58, the second valve 62, and the third valve 66. The controller 68 comprises a first button 70, a second button 72, a third button 74, and a fourth button 76. The first button 70, the second button 72, the third button 74, and the fourth button 76 are depressible.

The first button 70 is configured to be depressed to signal the microprocessor 56 to actuate the first valve 58 and to deactuate the second valve 62 to decrease the gap 20. The second button 72 is configured to be depressed to signal the microprocessor 56 to actuate the second valve 62 and to deactuate the first valve 58 to increase the gap 20. The third button 74 is configured to be depressed to signal the microprocessor 56 to actuate the third valve 66 to raise the forks 16 and the frame 14 to lift the load that is positioned on the pallet. The fourth button 76 is configured to be depressed to signal the microprocessor 56 to deactuate the third valve 66 to lower the forks 16 and the frame 14 to drop the load that is positioned on the pallet.

A shell 78 that is positioned around and coupled to the frame 14 is configured to shield the plurality of pneumatic cylinders 32, the compressor 48, the tank 50, the power module 52, the microprocessor 56, the first valve 58, the second valve 62, and the third valve 66.

A solar panel 80 that is coupled to the shell 78 is operationally coupled to the battery 54 so that the solar panel 80 is configured to convert electromagnetic radiation to an electrical current to charge the battery 54.

Each of a pair of side rollers 82 is coupled to a respective fork 16 so that the side roller 82 is perpendicular to the rear roller 22 of the respective fork 16. The side roller 82 extends below the respective fork 16 to contact a surface upon which the pallet jack 12 is positioned when the rear roller 22 of the respective fork 16 is in a raised position. The side roller 82 is configured to facilitate sideways locomotion of the pallet jack 12.

In use, the first button 70 and the second button 72 are used to signal the microprocessor 56 to selectively actuate the first valve 58 and the second valve 62 to adjust the gap 20 so that the forks 16 are insertable into the pallet. The third button 74 is depressed to signal the microprocessor 56 to actuate the third valve 66 to raise the forks 16 and the frame 14 to lift the load that is positioned on the pallet. The user is positioned to locomote the pallet jack 12 and the load using the tow bar 28. The fourth button 76 is depressed to signal the microprocessor 56 to deactuate the third valve 66 to lower the forks 16 and the frame 14 to drop the load.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A pneumatic cylinder actuated pallet jack assembly comprising:
 a pallet jack comprising:
  a frame, a pair of forks slidably coupled to and extending from a lower member of the frame such that a gap between the forks is selectively sizable, a pair of rear rollers, each rear roller being coupled to and extending from to a respective fork distal from the frame such that the respective fork is selectively vertically positionable relative to the rear roller, a roller module slidably coupled to the frame such that the frame is selectively vertically positionable relative to the roller module, the roller module being opposingly positioned on the frame relative to the forks, and a tow bar pivotally coupled to the frame proximate to the roller module;

a plurality of pneumatic cylinders coupled to the frame, respective pneumatic cylinders being operationally coupled singly to each of the forks, to each of the rear rollers, and to the roller module; and a compressor coupled to the frame and operationally coupled to the plurality of pneumatic cylinders such that the compressor is positioned for selectively actuating respective pneumatic cylinders firstly for sizing the gap for enabling insertion of the forks into a pallet and secondly for raising the forks and the frame for lifting a load positioned on the pallet facilitating a user to move the pallet jack and the load upon the rear rollers and the roller module using the tow bar.

2. The assembly of claim 1, further including the roller module comprising a pair of wheels.

3. The assembly of claim 1, further including the tow bar being operationally coupled to the roller module such that the roller module is selectively rotatable relative to the frame, concurrent with the tow bar, for steering the pallet jack.

4. The assembly of claim 1, further including a handle coupled to the tow bar distal from the frame wherein the handle is configured for grasping in a hand of the user facilitating the user to pivot the tow bar and for pulling on the handle for locomoting the pallet jack upon the rear rollers and the roller module.

5. The assembly of claim 4, further including the handle being elongated ovally shaped.

6. The assembly of claim 4, further including the plurality of pneumatic cylinders comprising:

a pair of first cylinders, each first cylinder being coupled to the frame proximate to a respective fork, the first cylinder being operationally coupled to the respective fork such that the first cylinder is positioned for reversibly motivating the respective fork horizontally relative to the frame;

a pair of second cylinders, each second cylinder being coupled to a respective fork proximate to an associated rear roller, the second cylinder being operationally coupled to the associated rear roller such that the second cylinder is positioned for reversibly lowering the associated rear roller from the respective fork; and a third cylinder coupled to the frame and operationally coupled to the roller module such that the third cylinder is positioned for reversibly lowering the roller module from the frame.

7. The assembly of claim 6, further comprising:

a pair of first plates, each first plate being coupled to a piston of a respective first cylinder;

a pair of rods, each rod being coupled to a respective first plate such that the rod extends from the respective first plate codirectionally and in parallel with an associated piston;

a pair of second plates, each second plate being coupled to a respective rod distal from an associated first plate, the second plate being coupled to and extending between the respective rod and an associated fork such that lateral movement of the second plate imparted by an associated piston is transferred to the associated fork.

8. The assembly of claim 7, further comprising:

a power module coupled to the frame;

a microprocessor coupled to the frame, the microprocessor being operationally coupled to the power module, the compressor, and the plurality of pneumatic cylinders;

a first valve operationally coupled to a first end of each first cylinder, the compressor, and the microprocessor such that the microprocessor is positioned for selectively actuating the first valve for decreasing the gap;

a second valve operationally coupled to a second end of each first cylinder, the compressor, and the microprocessor such that the microprocessor is positioned for selectively actuating the second valve for increasing the gap; and a third valve operationally coupled to the pair of second cylinders, the third cylinder, the compressor, and the microprocessor such that the microprocessor is positioned for selectively actuating the third valve for for raising the forks and the frame for lifting the load positioned on the pallet.

9. The assembly of claim 8, further including a controller coupled to the handle, the controller being operationally coupled to the microprocessor wherein the controller is configured for signaling the microprocessor for selectively actuating said first valve, said second valve, and said third valve.

10. The assembly of claim 9, further including the controller comprising a first button, a second button, a third button, and a fourth button, the first button, the second button, the third button, and the fourth button being depressible wherein the first button is configured for depressing for signaling the microprocessor for actuating the first valve and deactuating the second valve for decreasing the gap, wherein the second button is configured for depressing for signaling the microprocessor for actuating the second valve and deactuating the first valve for increasing the gap, wherein the third button is configured for depressing for signaling the microprocessor for actuating the third valve for raising the forks and the frame for lifting the load positioned on the pallet, wherein the fourth button is configured for depressing for signaling the microprocessor for deactuating the third valve for lowering the forks and the frame for dropping the load positioned on the pallet.

11. The assembly of claim 8, further including the power module comprising a battery, the battery being rechargeable.

12. The assembly of claim 11, further including a shell positioned around and coupled to the frame wherein the shell is configured for shielding the plurality of pneumatic cylinders, the compressor, the tank, the power module, the microprocessor, the first valve, the second valve, and the third valve.

13. The assembly of claim 12, further including a solar panel coupled to the shell, the solar panel being operationally coupled to the battery such that the solar panel is configured for converting electromagnetic radiation to an electrical current for charging the battery.

14. The assembly of claim 1, further including a tank coupled to the frame, the tank being operationally coupled to the compressor and the plurality of pneumatic cylinders wherein the tank is configured for storing compressed air.

15. The assembly of claim 1, further including a pair of side rollers, each side roller being coupled to a respective fork such that the side roller is perpendicular to the rear roller of the respective fork and such that the side roller extends below the respective fork for contacting a surface upon which the pallet jack is positioned when the rear roller of the respective fork is in a raised position wherein the side roller is configured for facilitating sideways locomotion of the pallet jack.

16. A pneumatic cylinder actuated pallet jack assembly comprising:
- a pallet jack comprising:
  - a frame,
  - a pair of forks slidably coupled to and extending from a lower member of the frame such that a gap between the forks is selectively sizable,
  - a pair of rear rollers, each rear roller being coupled to and extending from to a respective fork distal from the frame such that the respective fork is selectively vertically positionable relative to the rear roller,
  - a roller module slidably coupled to the frame such that the frame is selectively vertically positionable relative to the roller module, the roller module being opposingly positioned on the frame relative to the forks, the roller module comprising a pair of wheels,
  - a tow bar pivotally coupled to the frame proximate to the roller module, the tow bar being operationally coupled to the roller module such that the roller module is selectively rotatable relative to the frame, concurrent with the tow bar, for steering the pallet jack, and
  - a handle coupled to the tow bar distal from the frame wherein the handle is configured for grasping in a hand of a user facilitating the user to pivot the tow bar and for pulling on the handle for locomoting the pallet jack upon the rear rollers and the roller module, the handle being elongated ovally shaped;
- a plurality of pneumatic cylinders coupled to the frame, respective pneumatic cylinders being operationally coupled singly to each of the forks, to each of the rear rollers, and to the roller module, the plurality of pneumatic cylinders comprising:
  - a pair of first cylinders, each first cylinder being coupled to the frame proximate to a respective fork, the first cylinder being operationally coupled to the respective fork such that the first cylinder is positioned for reversibly motivating the respective fork horizontally relative to the frame,
  - a pair of second cylinders, each second cylinder being coupled to a respective fork proximate to an associated rear roller, the second cylinder being operationally coupled to the associated rear roller such that the second cylinder is positioned for reversibly lowering the associated rear roller from the respective fork, and
  - a third cylinder coupled to the frame and operationally coupled to the roller module such that the third cylinder is positioned for reversibly lowering the roller module from the frame;
- a pair of first plates, each first plate being coupled to a piston of a respective first cylinder;
- a pair of rods, each rod being coupled to a respective first plate such that the rod extends from the respective first plate codirectionally and in parallel with an associated piston;
- a pair of second plates, each second plate being coupled to a respective rod distal from an associated first plate, the second plate being coupled to and extending between the respective rod and an associated fork such that lateral movement of the second plate imparted by an associated piston is transferred to the associated fork;
- a compressor coupled to the frame and operationally coupled to the plurality of pneumatic cylinders such that the compressor is positioned for selectively actuating respective pneumatic cylinders firstly for sizing the gap for enabling insertion of the forks into a pallet and secondly for raising the forks and the frame for lifting a load positioned on the pallet facilitating the user to move the pallet jack and the load upon the rear rollers and the roller module using the tow bar;
- a tank coupled to the frame, the tank being operationally coupled to the compressor and the plurality of pneumatic cylinders wherein the tank is configured for storing compressed air;
- a power module coupled to the frame, the power module comprising a battery, the battery being rechargeable;
- a microprocessor coupled to the frame, the microprocessor being operationally coupled to the power module, the compressor, and the plurality of pneumatic cylinders;
- a first valve operationally coupled to a first end of each first cylinder, the compressor, and the microprocessor such that the microprocessor is positioned for selectively actuating the first valve for decreasing the gap;
- a second valve operationally coupled to a second end of each first cylinder, the compressor, and the microprocessor such that the microprocessor is positioned for selectively actuating the second valve for increasing the gap;
- a third valve operationally coupled to the pair of second cylinders, the third cylinder, the compressor, and the microprocessor such that the microprocessor is positioned for selectively actuating the third valve for raising the forks and the frame for lifting the load positioned on the pallet;
- a controller coupled to the handle, the controller being operationally coupled to the microprocessor wherein the controller is configured for signaling the microprocessor for selectively actuating said first valve, said second valve, and said third valve, the controller comprising a first button, a second button, a third button, and a fourth button, the first button, the second button, the third button, and the fourth button being depressible wherein the first button is configured for depressing for signaling the microprocessor for actuating the first valve and deactuating the second valve for decreasing the gap, wherein the second button is configured for depressing for signaling the microprocessor for actuating the second valve and deactuating the first valve for increasing the gap, wherein the third button is configured for depressing for signaling the microprocessor for actuating the third valve for raising the forks and the frame for lifting the load positioned on the pallet, wherein the fourth button is configured for depressing for signaling the microprocessor for deactuating the third valve for lowering the forks and the frame for dropping the load positioned on the pallet;
- a shell positioned around and coupled to the frame wherein the shell is configured for shielding the plurality of pneumatic cylinders, the compressor, the tank, the power module, the microprocessor, the first valve, the second valve, and the third valve;

a solar panel coupled to the shell, the solar panel being operationally coupled to the battery such that the solar panel is configured for converting electromagnetic radiation to an electrical current for charging the battery; and a pair of side rollers, each side roller being coupled to a respective fork such that the side roller is perpendicular to the rear roller of the respective fork and such that the side roller extends below the respective fork for contacting a surface upon which the pallet jack is positioned when the rear roller of the respective fork is in a raised position wherein the side roller is configured for facilitating sideways locomotion of the pallet jack.

* * * * *